United States Patent [19]
Osborn et al.

[11] Patent Number: 5,649,452
[45] Date of Patent: Jul. 22, 1997

[54] SHIFTER WITH MEANS FOR ACTUATING CABLE TO KEY MECHANISM

[75] Inventors: Charles Osborn, Spring Lake; Robert M. Medema, Muskegon; Andrew K. Ruiter, Spring Lake, all of Mich.

[73] Assignee: Grand Haven Stamped Products, a Division of JSJ Corp., Grand Haven, Mich.

[21] Appl. No.: 487,494

[22] Filed: Jun. 7, 1995

Related U.S. Application Data

[63] Continuation-in-part of Ser. No. 419,804, Apr. 11, 1995, Pat. No. 5,588,934.

[51] Int. Cl.⁶ ............................. F16H 61/18; F16H 63/36
[52] U.S. Cl. ..................... 74/477; 477/96; 74/569; 192/44
[58] Field of Search .................. 192/4 A; 477/96, 477/99; 74/475, 476, 477, 483 R, 569

[56] References Cited

U.S. PATENT DOCUMENTS

| | | | |
|---|---|---|---|
| 4,926,688 | 5/1990 | Murasaki | 477/99 X |
| 5,085,096 | 2/1992 | Behrens | 74/475 |
| 5,275,065 | 1/1994 | Ruiter | 74/483 R |
| 5,293,763 | 3/1994 | Asano et al. | 477/99 X |
| 5,379,872 | 1/1995 | Dorr et al. | 192/4 A |
| 5,490,585 | 2/1996 | Togano et al. | 477/99 X |
| 5,494,141 | 2/1996 | Osborn et al. | 192/4 A |

*Primary Examiner*—Charles A. Marmor
*Assistant Examiner*—Saul Rodriguez
*Attorney, Agent, or Firm*—Price, Heneveld, Cooper, DeWitt & Litton

[57] ABSTRACT

A vehicle shifter having a cable actuator that is responsive to the ignition key steering lock mechanism of a vehicle and actuates a cable attached to and extending between the key mechanism and the shifter. A cam responsive to the shifting of the shifter's handle is operatively connected to the cable actuator so that when the key is turned off, the cam locks the handle in "Park" and when the ignition key is turned on, the cam can be pivoted by the handle to actuate the cable actuator which actuates the cable to prevent the ignition key from being withdrawn. Preferably, the cable actuator is also a cam which is engaged and pivoted by the first-mentioned cam to actuate the cable. A safety mechanism is provided to prevent damage to the cable and other elements in the event an inadvertent force is exerted on the shift lever.

13 Claims, 5 Drawing Sheets

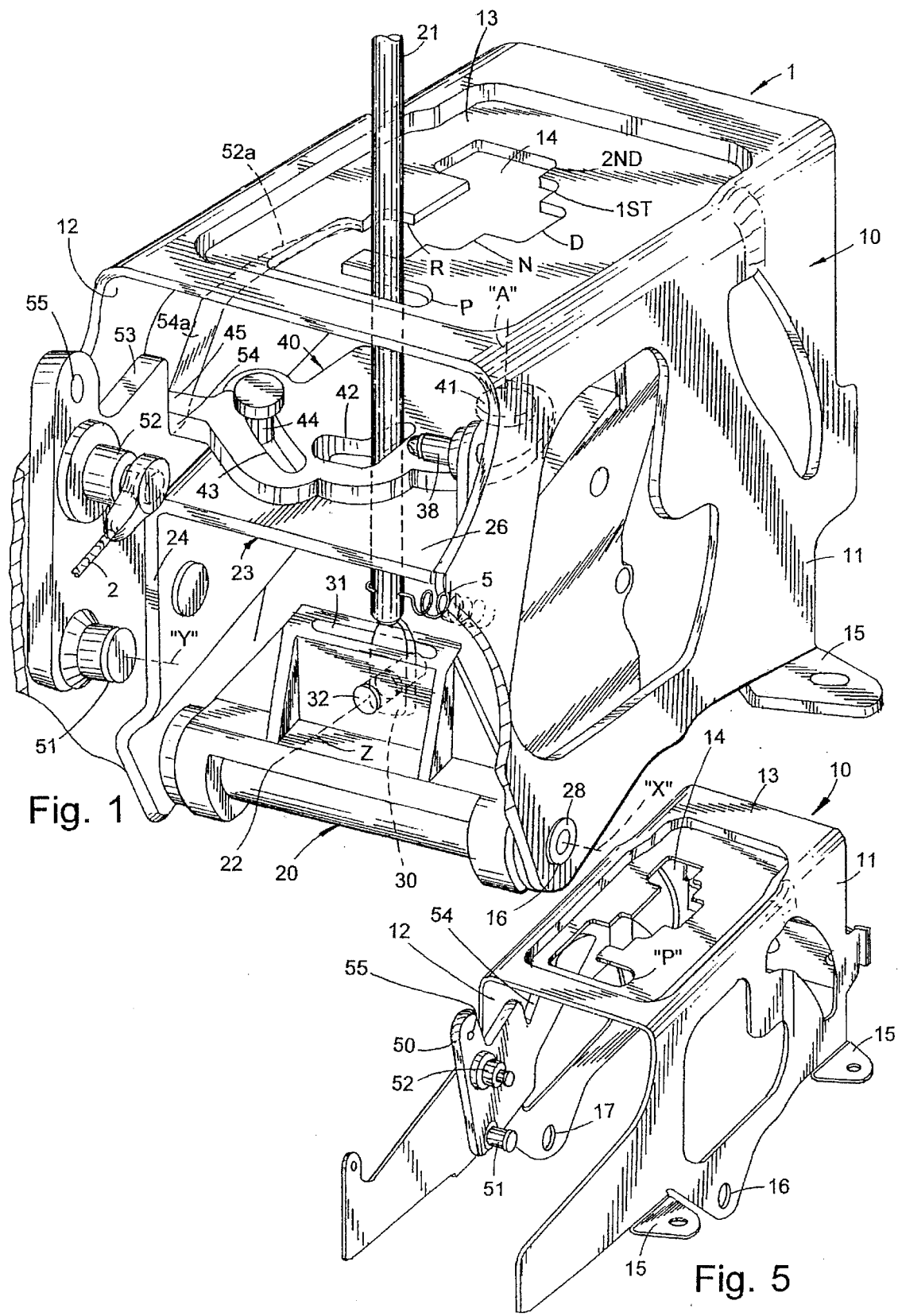

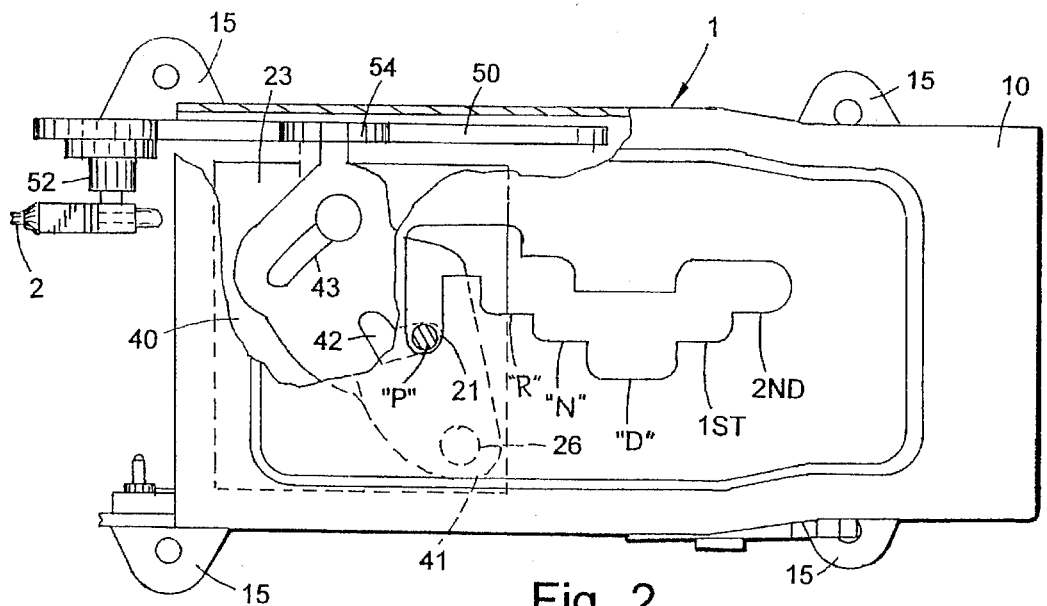
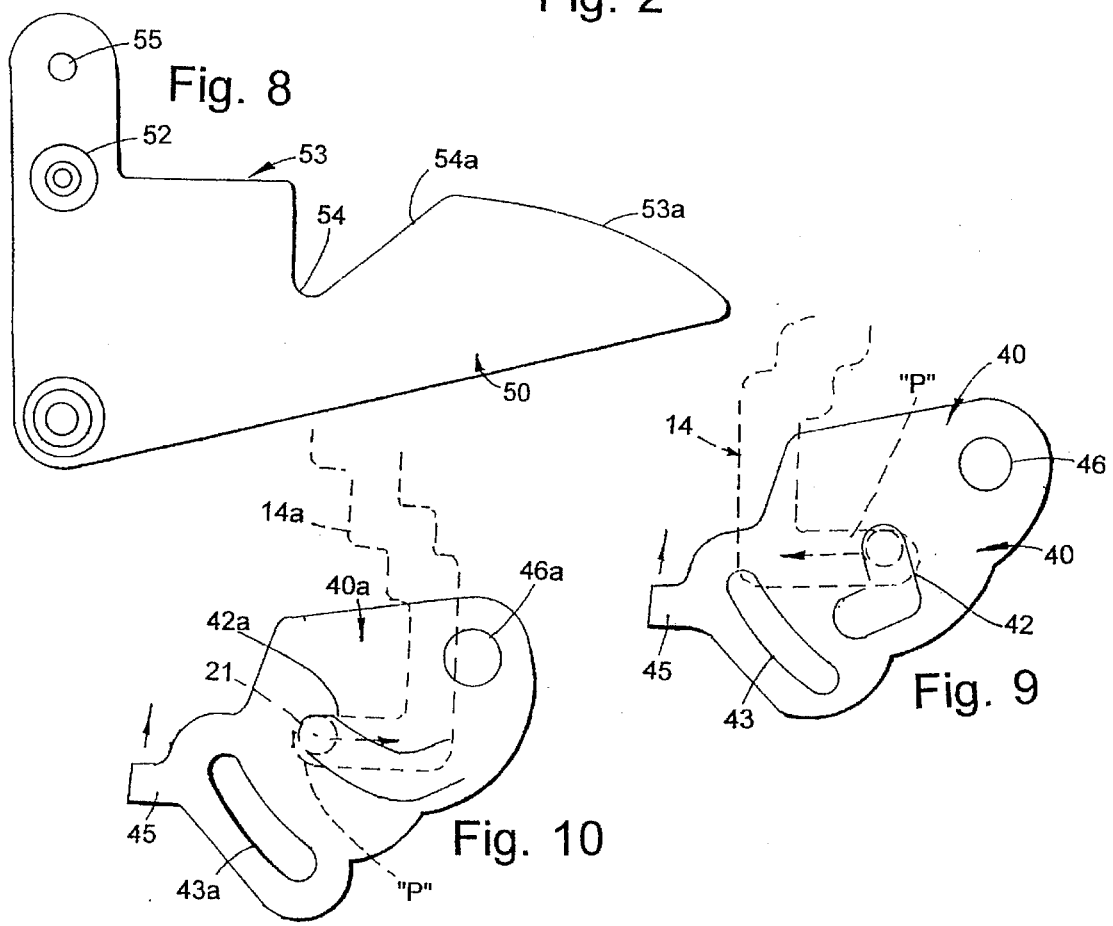

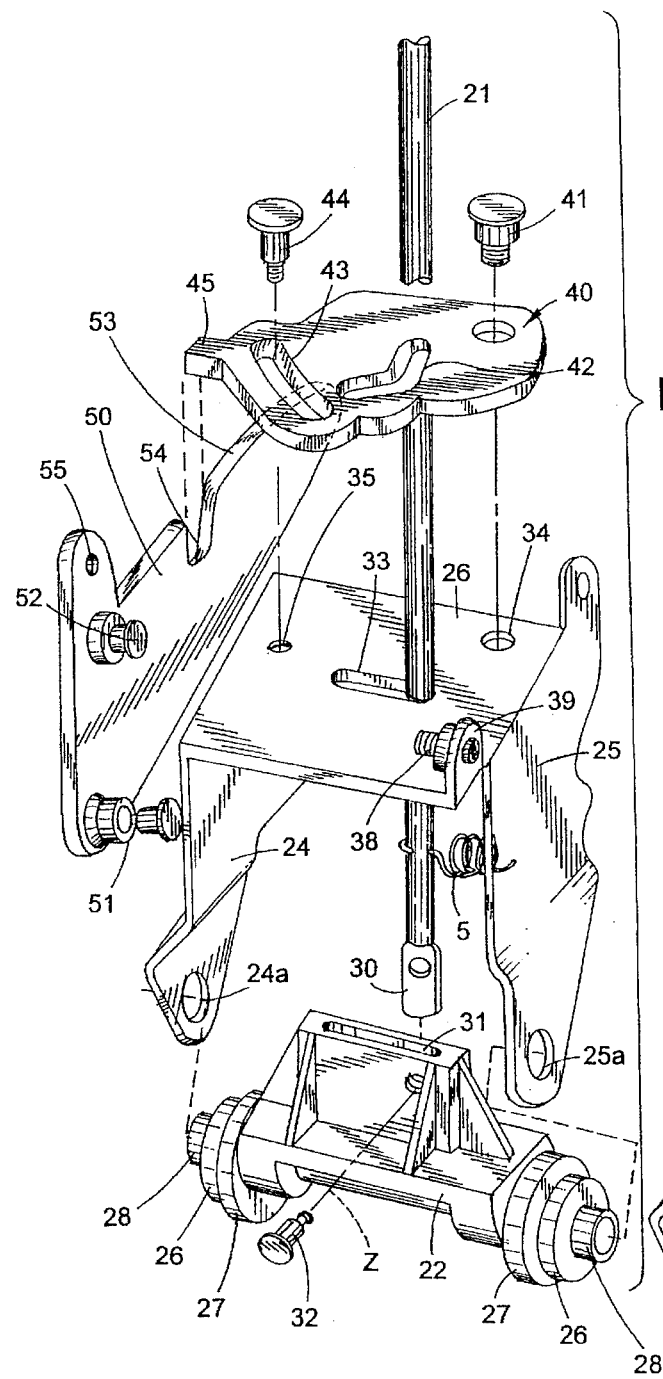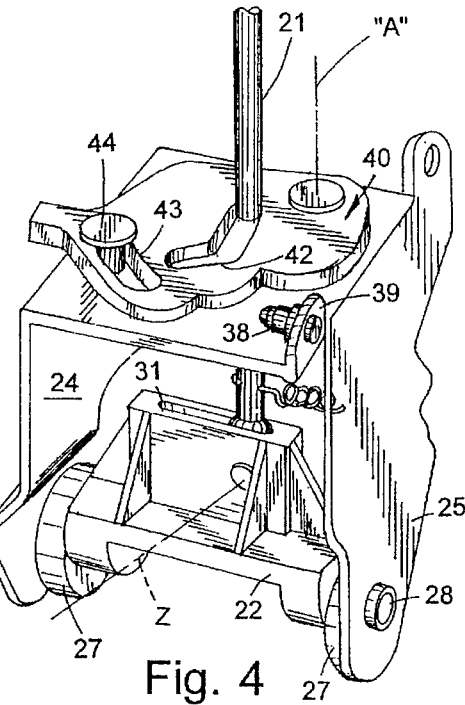

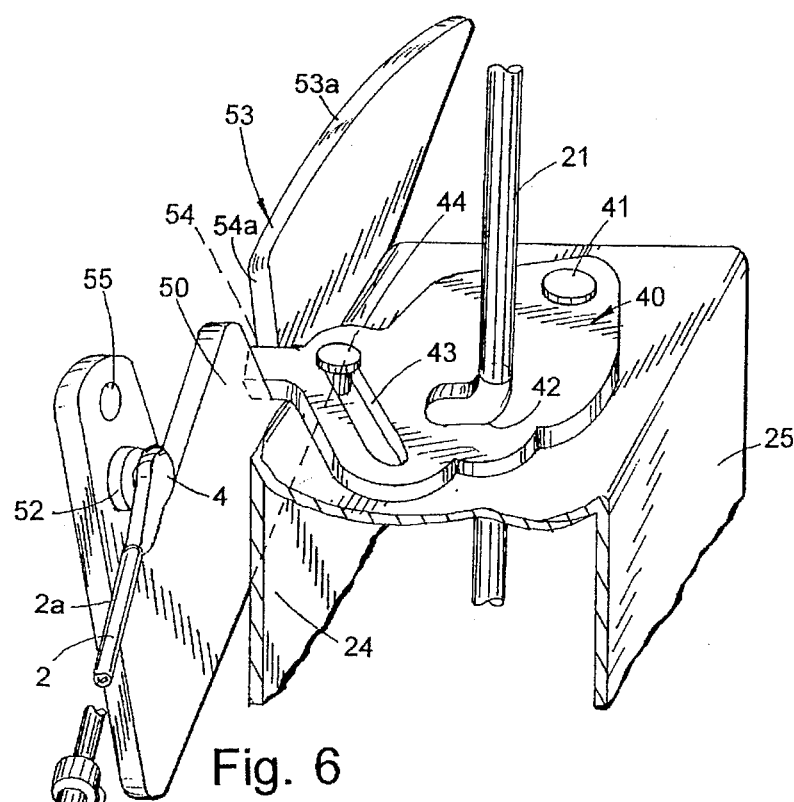
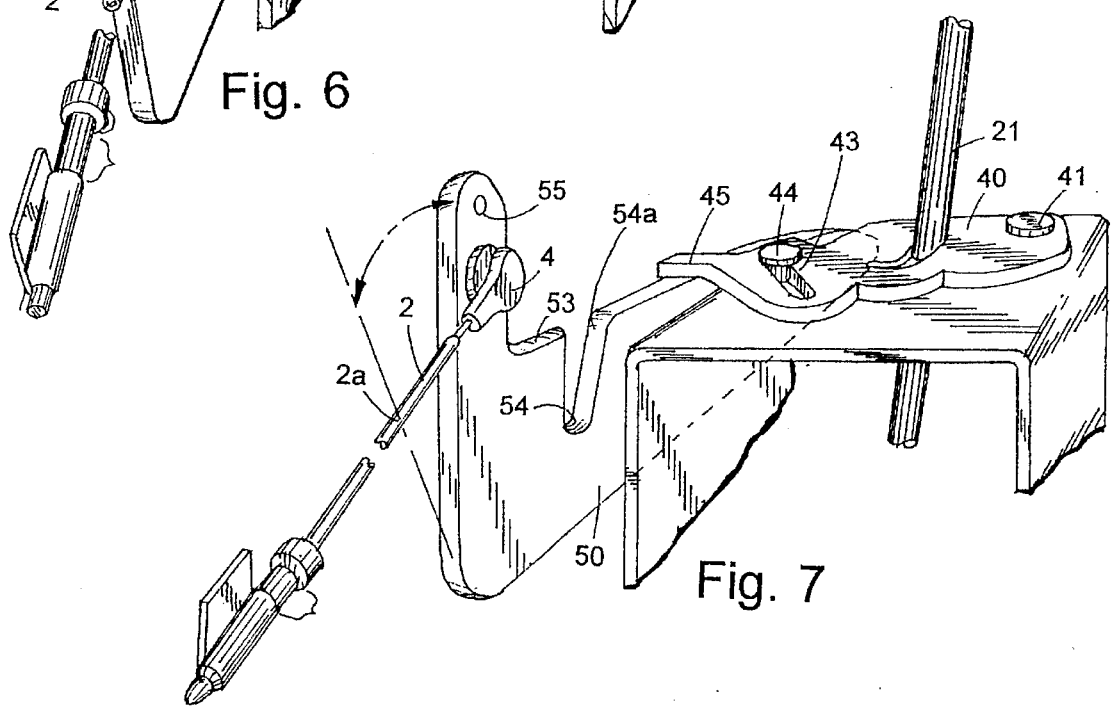

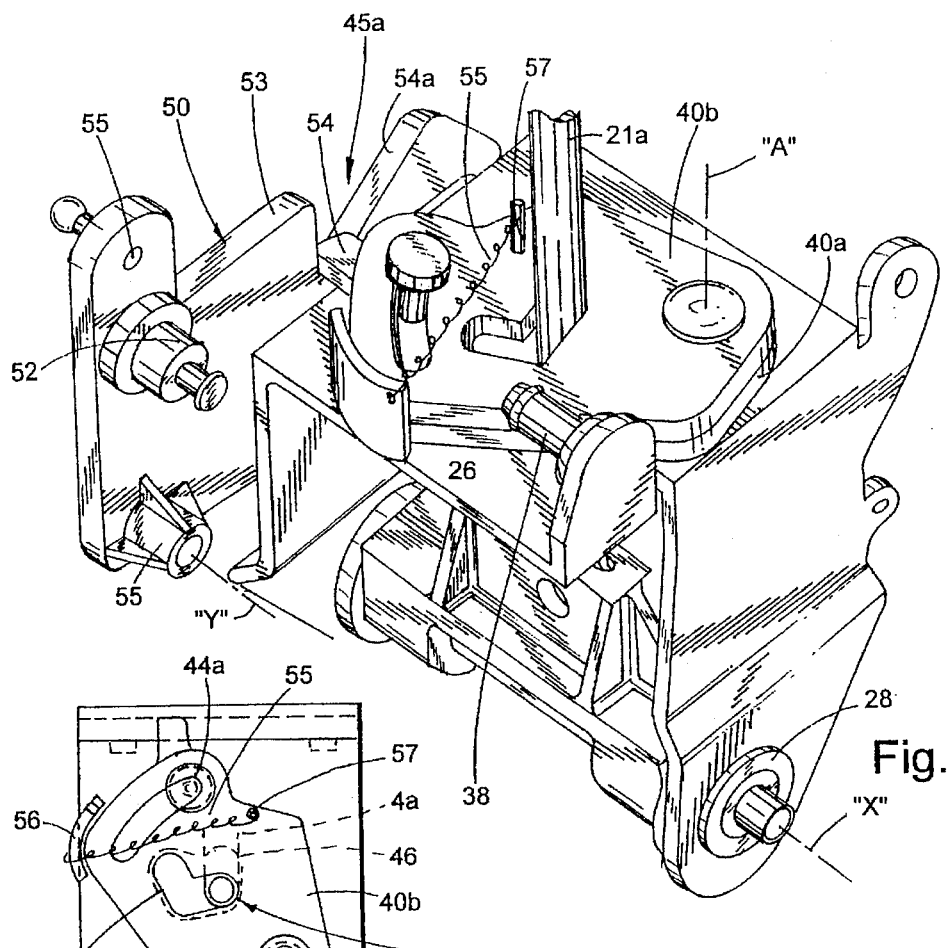
Fig. 11
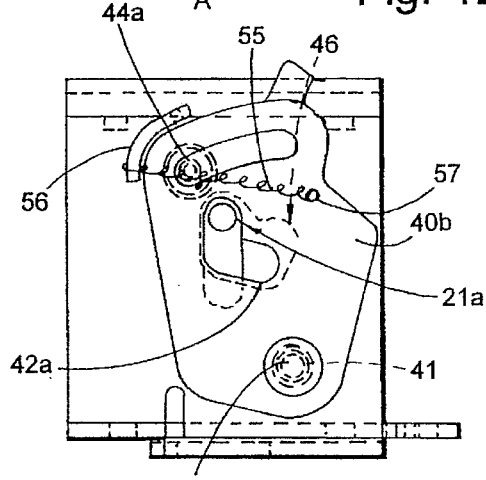
Fig. 12
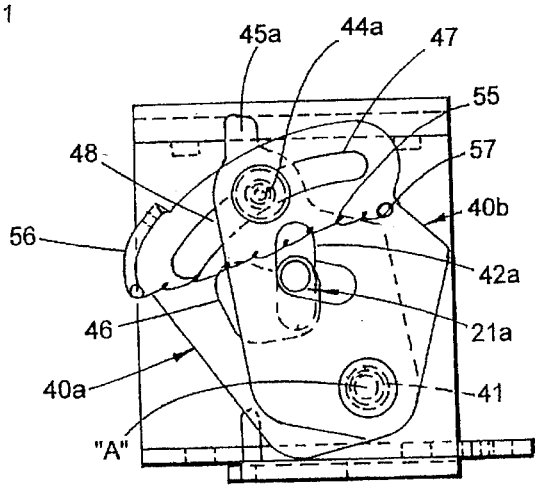
Fig. 14
Fig. 13

SHIFTER WITH MEANS FOR ACTUATING CABLE TO KEY MECHANISM

This application is a continuation-in-part of previously filed application Ser. No. 08/419,804 filed on Apr. 11, 1995 and entitled SHIFTER WITH MEANS FOR ACTUATING CABLE TO KEY MECHANISM now U.S. Pat. No. 5,588,934.

This invention relates generally to a locking mechanism and system for controlling the shifting of a lever for an automatic transmission, and more particularly for locking the shift lever in a "Park" position against rotation to other gear positions. More specifically, this invention relates to a locking mechanism in which the detent plate is located substantially on a horizontal plane and the detent opening extending fore and aft from "Park" position to the other shift positions has a serpentine shape. This type of shifter is generally referred to as a serpentine shifter.

BACKGROUND OF THE INVENTION

In vehicles which are equipped with automatic transmissions, the shifting lever is movable from a "Park" position to other gear positions such as "Reverse," "Neutral," "Drive," "2nd Gear," and "1st Gear." In the serpentine type of shifter, a substantially horizontal detent plate or platform is provided with a detent opening in the plate in which the handle of the shifting lever dwells for the various "Park" and other gear positions. Therefore, when shifting the handle is required to be actuated in a direction lateral to the fore and aft direction. The lever is releasably held in the "Park" position and to take the transmission out of "Park," the handle is actuated size-wise out of the park notch and then rearwardly to either "Reverse," "Neutral," and other drive positions.

Presently, there is in existence steering lockout mechanisms located in the steering column of the vehicle which are adapted to prevent the shifting lever from being shifted until the steering mechanism is out of lock. In other words, such steering lockout mechanisms prevent the premature acceleration of the vehicle while the steering mechanism is locked. This has been accomplished by a cable extending from the steering lockout mechanism located in the steering column to the transmission shifter. The cable prevents the shifter from being actuated out of the "Park" position until the steering lockout mechanism is released and prevents the withdrawal of the ignition key from the ignition when the shifter is out of "Park." Efforts thus far made in developing mechanisms for locing the shifting lever in a park/lock position before the steering lockout mechanism is released have been very complicated, particularly in the serpentine type of shifter.

The object of the present invention is to provide a simplified, low-cost version of a lockout mechanism for preventing the driver from shifting a shifter lever from "Park" to another gear position only when the steering lock mechanism is released by actuation of the ignition key and for preventing the withdrawal of the ignition key from the ignition only after the shifter has returned to the "Park" position.

SUMMARY OF THE INVENTION

The above object of locking the shifting lever in the "Park" position until the steering lock mechanism is released by actuation of the ignition key is achieved by providing a cable actuator operatively connected to the cable that controls the key lockout mechanism of the vehicle. A first cam is mounted on the lever assembly, and operatively connected to the cable actuator for actuating the cable actuator in response to the shifting of the lever assembly from "Park" position to other shifter positions. Preferably, the cable actuator is a second cam and the first and second cam members are arranged at angles relative to each other. The shifting of the lever assembly from "Park" position to other shifter positions pivots the first cam which in turn pivots the second cam so as to actuate the cable connected to the ignition key lockout mechanism.

In the preferred embodiment of this invention, the shifter lever assembly includes an inverted, U-shaped saddle bracket having spaced legs depending downwardly from a platform and the first cam member is pivotally mounted on said platform. The platform includes a first slot permitting the side-wise movement of the handle or rod of the lever assembly. The first cam member also includes a slot receiving said handle extending therethrough and shaped to govern the pivotal movement of the first cam as it is pivoted by the lever handle being shifted out of "Park." This pivotal movement in turn pivots the second cam and holds the second cam in the pivoted position so that while the lever handle is out of "Park," the cable attached to the second cam controls the ignition key lockout mechanism that prevents the withdrawal of the key from the ignition until the handle of the shifter lever is returned to the "Park" position.

Also, in accordance with this invention, we provide a safety mechanism which permits the shift lever to move to a limited degree in the event the cable is stuck, thereby preventing the breaking of the cable and other elements of the shift mechanism should a force inadvertently be exerted on the shift lever.

Having briefly described the essential features of our invention, the following drawings and more detailed description will serve to explain the concepts and principles of the invention.

BRIEF DESCRIPTION OF THE DRAWINGS

FIG. 1 is a front, elevational perspective view of the vehicle transmission shifter of this invention;

FIG. 2 is a top plan view of the vehicle transmission shifter of FIG. 1 in which the top wall of the housing is cut away to show portions of the two cam members forming a part of this invention;

FIG. 3 is a front, elevational, exploded, perspective view of the shifter lever assembly and the two cams which form an important part of this invention;

FIG. 4 is a front, elevational, perspective view of the lever assembly upon which one of the cams is pivotally mounted;

FIG. 5 is a front, elevational, perspective view of the housing including the second cam pivotally mounted on one of the walls thereof;

FIG. 6 is a perspective sketch of the two cams and illustrates the relationship thereof when the shifter lever is in the locked "Park" position;

FIG. 7 is another perspective sketch of the relationship between the two cams when the lever is out of "Park" and in one of the other drive positions;

FIG. 8 is a plan view of one of the cams;

FIG. 9 is a plan view of the other cam in which the openings through which the handle extends is shaped and positioned for a transmission shifter in which the driver is positioned on the left side of the vehicle;

FIG. 10 is a plan view of the other cam in which the opening through which the handle extends is shaped and positioned for use in a shifter in which the driver is on the right side of the vehicle;

FIG. 11 is a front-elevational perspective view of a modified version of the present invention in which a safety mechanism is provided to prevent damage to the cable or other elements of the shifter;

FIG. 12 is a plan view of the modification of FIG. 11 in an at rest position;

FIG. 13 is a plan view of the modification of FIG. 11 in a shifted position; and FIG. 14 is a plan view of the modification of FIG. 11 in a position where a force has been inadvertently exerted on the shift lever while the cable is locked.

DESCRIPTION OF THE PREFERRED EMBODIMENTS

Referring to the drawings and particularly FIG. 1, reference numeral 1 designates an automatic shifting mechanism for an automotive vehicle which is especially adapted for controlling a lockout mechanism (not shown) of a common and conventional design well known in the industry. Such lockout mechanism locks the steering wheel when the ignition key is in "LOCK" position and prevents the withdrawal of the key when the shifter is out of the "PARK" position. Such mechanisms are conventional and well known in the art.

As disclosed in FIGS. 1, 6, and 7, the shifter is connected to a cable 2 which in turn is connected to the lockout mechanism at the ignition key. As previously stated, this cable 2 prohibits the shifting of the shift lever out of the "Park" position unless the lockout mechanism, which is controlled by the ignition key and which prevents turning of the steering wheel, is released to permit the turning of the wheel. Further, the cable 2 prohibits the withdrawing of the key from the ignition unless the shifter is in the "Park" position.

As disclosed in the drawings, shifter 1 includes the housing 10 which has an inverted U-shape and includes the side walls 11 and 12 and the top wall 13. A serpentine-shaped detent slot or opening 14 is located in the top wall 13 which includes a series of notches represented by the letters "P," "R," "N," "OD," "D," "2nd," and "1st" which designate "PARK," "REVERSE," "NEUTRAL," "OVER DRIVE," "DRIVE," "2ND," and "1ST." Thus, as is well known in the art, shifting the shifting lever designated by the reference numeral 21 will shift the automatic transmission to such gear positions. The housing 10 is adapted to be secured to the floor pan of the vehicle by flanges as designated by the reference numeral 15.

A shifting lever assembly 20 is pivotally mounted inside the housing 10 about axis "X." Lever assembly 20 includes the handle or rod 21 extending upwardly through the serpentine opening 14 and pivotally secured about axis "Z" at its lower end to a base 22 which in turn is secured to a saddle bracket 23. Base 22 is secured to the lower ends of the legs 24 and 25 (FIGS. 1 and 4) which are connected together at their top ends by a platform 26. As best disclosed in FIGS. 3 and 4, the base 22 includes the cylindrical flanges 27 and 27a at each end. The flanges 27a extend through the openings 24a and 25a of saddle bracket 23 (FIG. 3) while the flanges 27 abut against the inner surfaces of the lower ends of the sides 24 and 25 (FIG. 4). A spacer 28 extends from the flanges 27a and extends into the openings 16 and 17 of housing 10 (FIG. 5) wherein they are riveted or bolted to establish the space between walls 11 and 12. Lever assembly 20 is pivoted about the axis "X."

The handle or rod 21 includes a flat end portion 30 extending into a recess 31 of base 22 in which it is pivotally mounted on the pin 32. The handle 21 also extends through an elongated opening 33 (FIG. 3) extending lateral of the fore and aft direction of the shifter assembly which permits the pivoting of handle 21.

A cam 40 is pivotally mounted on platform 26 about axis "A" by means of pin 41 secured in the opening 34 in the platform 26 (FIG. 3). The cam 40 includes the slots 42 and 43. The rod or handle 21 extends through slot 42. A pin 44 extends through the slot 43 and is secured in the opening 35 in the platform 26. As will be explained hereinafter, slot 42 controls or governs the pivotal movement of cam 40 while the pin 44 extending through the slot 43 provides a guide for such pivotal movement. Cam 40 includes a finger 45 which engages a second cam 50.

Cam 50 is an actuating cam pivotally mounted on the wall 12 of housing 10 about the axis "Y" (FIGS. 1 and 5) by means of the pin 51 secured to the wall 12 of housing 10. Cable connector 52 is attached to cam 50 above pin 51 and axis "Y" for attaching cable 2 to the cam 50 so that pivotal movement of cam 50 is transmitted to cable 2 for controlling the lockout mechanism (not shown) in the steering column. As disclosed in FIGS. 3, 6, and 7, pivoting of cam 40 by the rod or handle 21 pivots cam 50 for actuating the cable 2. This is achieved by the shape of the top edge 53 of cam 50 which includes a recess 54 in which the finger 45 is located when the rod or handle 21 is located in the "Park" notch "P." In this position of the finger 45, when the ignition is off, cable 2 prohibits pivoting of cam 50 in a clockwise direction, and accordingly, cam 40 is prohibited from pivoting which locks the shifter in the "Park" position with the rod or handle 21 located in the "Park" notch "P." As best disclosed in FIG. 8, the recess or notch 54 includes a ramp 54a which, when the ignition key is in the "On" position and as the rod or handle 21 is pivoted laterally out of the park notch "P," the handle 21 cams against the surfaces of the cam slot 42 in the cam 40 causing cam 40 to pivot in a clockwise direction. As cam 40 pivots, finger 45 rides on ramp 54a causing cam 50 to rotate downwardly to the position as disclosed in FIG. 7, after which the finger 45 rides on the surface 53a which holds cam 50 in the pivoted position of FIG. 7. In this position, cable 2 is actuated causing the ignition mechanism to lock the key in the ignition thereby preventing the withdrawal thereof while the shifter is out of the "Park" position. It should be evident in the pivoting of cam 40, the pin 44 extending through the slot 43 assists in guiding the finger 45 as it rides over the edge 53 of cam 50.

As disclosed in FIGS. 1, 3, and 4, a spring 5 is provided for biasing the handle or rod 21 in a direction to the right as viewed in FIGS. 1, 3, and 4. Spring 5 along with the shape of the cam slot 42 in cam 40 exerts a resisting force against the movement of the rod or handle 21 out of the "Park" notch "P." In other words, spring 5 and the angle of the cam slot 42 and the shape thereof requires a predetermined force to move the handle out of the "Park" position. This is important in that it prevents the handle from accidentally moving out of the "Park" notch "P."

Cam 50 also includes a portion extending upwardly above the cable connector. This portion has an opening 55 for securing a magnetically-actuated latch mechanism (not shown) actuated by application of the brake of the vehicle. Such mechanisms are like those disclosed in U.S. Pat. No. 5,275,065 and U.S. patent application Ser. No. 08/331,358, filed on Oct. 27, 1994, now U.S. Pat. No. 5,494,141.

The design of this shifter makes it very easy to convert or redesign a shifter designed to be actuated by a driver sitting on the left side of the vehicle to a design in which the driver is sitting on the right side of the vehicle as in foreign countries such as Great Britain. The only requirement is to change the shape and position of slot 42 and the shape of the serpentine cutout 14 in the top wall of the housing 10. FIG. 10 illustrates this by a simple sketch in which the serpentine cutout 14a is reversed so that the notch "P" extends to the left as compared to the notch "P" extending to the right as disclosed in FIG. 9. It should be evident, as disclosed in FIG. 10, when the handle 21 is pivoted to move to the right through the "Park" notch "P" as indicated by the arrow, the cam 40a is pivoted in a clockwise direction so as to pivot the cam 50 in the same way as previously described.

Operation

Having described the transmission shifter mechanism of this invention, its operation should be evident from the above description. Nevertheless, the following is a brief description of the shifter mechanism.

Assuming the ignition key is turned to the "Off" position, the shifting of the lever shifter from the "Park" position in the notch "P" to another gear position is prevented by the cable 2 extending from the steering lockout mechanism located in the steering column. In other words, cam 50 is prohibited by cable 2 from pivoting. Therefore, the shifter is locked in "Park" position.

Once the ignition key is turned "On," the steering lockout mechanism releases the cable permitting the rod or handle 21 to move in the notch in a direction where the handle can then be pivoted about the axis "Z" out of the notch "P." As the handle or rod 21 is pivoted in a direction out of the notch "P," it engages the walls of the opening or slot 42 of the cam 40. Spring 5 and the shape and angle of the cam slot 42 applies some resistance to the movement of the rod or handle through the cam slot 42 but nevertheless, handle 21 causes cam 40 to pivot about the axis "A" and in so pivoting, pin 44 riding in the slot 43 guides the pivoting action of the cam 40. As cam 40 pivots in a clockwise direction, finger 45 located in the recess or notch 54 rides on the ramp 54a then 53a causing cam 50 to pivot clockwise about the axis "Y" which exerts a tensile force on cable 2. This tensile force on cable 2 is transmitted to the ignition key locking mechanism which is constructed to prevent the key from being removed from the ignition while the force is exerted on cable 2. A comparison of FIGS. 6 and 7 illustrates when a tensile force is exerted on the cable. It discloses that when the shifter is in the park/locked position of FIG. 6, sheath 2a of the cable is located against the connector member 4. However, when the shifter is out of the "Park" position (FIG. 7), the pulling force of cam 50 on cable 2 provides a space between the sheath 2a and the connector member 4. In this position, the finger 45 continues to exert a pulling force on cable 2 by holding cam 50 in the pivoted position. When the shifter is returned to "Park," finger 45 returns to the position of FIG. 6 and cam 40 with the assistance of a biasing force on the cable at the ignition key locking mechanisms returns cam 50 to the position of FIG. 6.

It should be noted that in actuating the lever mechanism, the entire saddle bracket 23 and the lever assembly, including the handle 2 and base 20, are pivoted within the housing 10 about the axis "X." In so pivoting, the transmission is actuated by a cable attached to the cable connector 38 which is mounted on a flange 39.

Modification

FIGS. 11–14 disclose a modification of the present invention in which a safety mechanism is provided to prevent an inadvertent force exerted on the shifter lever 21 from damaging the cable or other elements of the shifting mechanism. In other words, if the cable is locked at the ignition key, the shifting lever 21a can move under certain forces exerted thereon without exerting adverse force on the cable or the other elements of the shifting mechanism.

FIG. 11 discloses a mechanism very similar to that disclosed in FIG. 4. The major difference is that the cam elements 40a and 40b are substituted for the single cam 40 as disclosed in FIGS. 1, 3, 4, 6, and 7. The cam element 40a is mounted under the cam element 40b and includes the finger 45a located in the recess or notch 54 of the cam 50. The cam 50 is substantially identical to the cam 50 previously described in relation to FIGS. 1–10. It includes the ramp 54a extending upwardly from the bottom of the notch 54 and also the cable connector 52 and the boss 55 for receiving a pin about which cam 50 pivots as it is actuated by the finger 45a.

The two cam elements 40a and 40b are interconnected for movement together or relative one to the other by the shifting lever 21a which extends through the slot 42a of cam 40b and slots 46 of the bottom cam 40a. These slots are so arranged that as illustrated in FIG. 14, the shifting lever can independently rotate cam 40b relative to cam 40a as demonstrated in FIG. 14. The slot 46 is shaped to provide the pocket 46a which limits the movement of the shifting lever handle 21 to prevent it from being shifted out of the park gate "P" when the cable is locked. Such position is disclosed in FIG. 1 by the broken lines depicting the moved position (FIG. 14) of handle 21a still within the park gate "P."

Both the bottom and top cams 40a and 40b are rotatable about the pin 41 about the axis A. They are pivotable together as disclosed in FIG. 13 or the top cam 40b is pivotable independently of the lower cam 40a. This independent pivoting of cam 40b is determined by the resistance offered by the cable and cam 50 on the finger 45a. In other words, if the cable is locked, a substantial resistance to the rotation of cam 50 is transmitted to the finger 45a. In such event, pin 44a extending through the slot 47 slides in the slot 48 of cam 40a, thus accommodating the movement of the shifter handle 21a as illustrated in FIG. 14.

Two cams 40a and 40b are movable together to actuate cam 50 as the finger 45a rides on the ramp 54a and pivots cam 50 about the axis "Y." This position is disclosed in FIG. 13 wherein the shifter handle 21a is moved out of the park gate. As previously stated, this can only occur when the ignition cable is relaxed by turning the ignition key.

The amount of force exerted on finger 45a that permits the relative movement of cam 40b in relation to cam 40a is determined by the spring 55 connected between the stop 56 extending upwardly from cam 40a and the pin 57. For example, if it is determined that the upper limit of force to be exerted on the shifting lever 21a is 50 lbs., spring 55 prevents upper cam member 40b from moving relative to the lower cam 40a until such time as the biasing force of spring 55 is overcome, permitting the movement of cam 40b relative to cam 40a. Accordingly, the biasing strength of the spring 45 is selected to control the movement of upper cam 40b.

Having described the various components of this modification and portions of the operation thereof, the operation should be evident. Starting with FIG. 12, the two cams are shown with the shifter in "Park" and the shift lever 21a in a relaxed position without any or very little force exerted thereon. When the ignition key is turned and cam 50 is free to rotate and exert a pull on the cable extending between it and the ignition key, very little force is exerted on finger 45a and as a result, as disclosed in FIG. 13, both cams 40a and 40b rotate together as disclosed in FIG. 13. This is accomplished as the shift lever 21a rides in the slot 42a of cam 40b and in the slot 46 of cam 40a. The finger 45a is thus cammed along the ramp 54a to rotate cam 50 and actuate the ignition cable.

In the event the ignition cable is locked and cam 50 is therefore locked, or if cam 50 is locked for some other reason, and the force exerted on shift lever 21a is sufficient to overcome the biasing force of the spring 55, the shift lever 21a will move within the slot 42a to a position as disclosed in FIG. 14. This causes the top cam 40b to pivot relative to the bottom cam 40a which takes up the force exerted on the shifting lever 21a and prevents the finger 45a from actuating the cable 50. This prevents either breaking of the cable or damage to other parts of the shifting mechanism. Thus, the modification as disclosed in FIGS. 11–14 provides a safety mechanism that takes up inadvertent unusual forces exerted on the shifting lever 21a.

From the foregoing description, it should be readily evident by those skilled in the art that the present invention provides a novel park/lock mechanism for a serpentine type of automatic shifter wherein the shifter is locked in "Park" position until the ignition key of the vehicle is turned "On." The structure of the invention is relatively low in cost and the operation is accomplished by two relatively low-cost, molded cams. Thus, the mechanism includes a minimum of parts which are easy to assemble, thereby resulting in cost savings not only because of the reduced cost of the parts themselves but also in the labor costs.

Those skilled in the art will, of course, appreciate the many advantages of the present invention over that shown in the prior art and will also recognize that many modifications can be made without departing from the concept and spirit of the invention. It is, therefore, intended that equivalent arrangements are to be included as part of this invention.

The embodiments of the invention in which an exclusive property or privilege is claimed are defined as follows:

1. A transmission shifter for a vehicle including a shifter lever assembly having a handle, means for guiding said handle in movements along a serpentine path in shifting from "Park" position to other shifter positions said serpentine path including movements in fore and aft directions and sidewise directions transverse to said fore and aft directions, a cable connector for operatively connecting said lever assembly to a cable extending from a key mechanism of said vehicle to said shifter, the improvement comprising:

a first cam member;

a second cam member operatively connected to said cable connector;

an operative connection between said lever assembly and said second cam member; said first cam member being mounted on said lever assembly and engaging said second cam member for moving said second cam member for actuating said cable connector to actuate said cable;

a third cam member; and an operative connection between said first cam member and third cam member whereby if an undesirable force is exerted on said handle, said third cam member is moved relative to said first cam member to take up such force and prevent movement of said first cam member.

2. The shifter of claim 1 in which said first and third cam members are arranged at angles relative to said second cam member.

3. A transmission shifter for a vehicle including a shifter lever assembly having a handle, means for guiding said handle along a serpentine path in shifting from "Park" position to other shifter positions, a cable connector for operatively connecting said lever assembly to a cable extending from a key mechanism of said vehicle to said shifter, the improvement comprising:

a first cam member;

a second cam member operatively connected to said cable connector;

an operative connection between said lever assembly and said second cam member; said first cam member being mounted on said lever assembly and engaging said second cam member for moving said second cam member for actuating said cable connector to actuate said cable;

a third cam member; and an operative connection between said first cam member and third cam member whereby if an undesirable force is exerted on said handle, said third cam member is moved relative to said first cam member to take up such force and prevent movement of said first cam member; said first cam member and third cam member being pivoted relative to said lever assembly about a first axis; said second cam member is pivoted about a fixed second axis; said lever assembly is pivotal in a fore and aft direction about a third axis parallel to said second axis and said handle is pivotal on said lever assembly in a side-wise direction about a fourth axis; said first cam member and third cam member being normally movable with said lever assembly in a fore and aft direction and pivotal about said first axis by the pivotal movement of said rod in a side-wise direction.

4. The shifter of claim 3 in which said lever assembly includes an inverted, U-shaped saddle bracket having spaced legs depending downwardly from a platform; said first and third cam members being pivotally mounted one on top of the other on said platform.

5. The shifter of claim 4 in which said platform includes a first slot extending laterally across said fore and aft direction; said first cam member includes a second slot shaped to govern the pivotable movement of said first cam member; said third cam member including a third slot to govern the pivotal movement of said third cam member; and said handle extends through said first, second, and third slots and is pivoted to move through said first, second, and third slots and pivot said first cam member.

6. The shifter of claim 5 in which said first cam member includes a finger extending over the upper edge of said second cam member; said upper edge being shaped to be engaged by said finger whereby pivoting of said first cam member by said handle as it is moved through said first and second slots pivots said second cam member to move said finger which, in turn, moves said cable connector and actuates said cable; said third cam element being mounted on top of said first cam member; and a spring secured between said first and third cam members to control the force required for said third member to move relative to said first cam member.

7. A transmission shifter for a vehicle including a shifter lever assembly having a handle, means for guiding said handle along a serpentine path in shifting from "Park" position to other shifter positions, a cable connector for operatively connecting said lever assembly to a cable extending from a key mechanism of said vehicle to said shifter, the improvement comprising:

a first cam member;

a second cam member operatively connected to said cable connector;

an operative connection between said lever assembly and said second cam member; said first cam member being mounted on said lever assembly and engaging said second cam member for moving said second cam member for actuating said cable connector to actuate said cable;

a third cam member; and an operative connection between said first cam member and third cam member whereby if an undesirable force is exerted on said handle, said third cam member is moved relative to said first cam member to take up such force and prevent movement of said first cam member; said lever assembly including an inverted, U-shaped saddle bracket having spaced legs depending downwardly from a platform; said first and third cam members being pivotally mounted one on top of the other on said platform.

8. The shifter of claim 7 in which said platform includes a first slot extending laterally across said fore and aft direction; said first cam member includes a second slot shaped to govern the pivotable movement of said first cam member; said third cam member including a third slot to govern the pivotal movement of said third cam member; and said handle extends through said first, second, and third slots and is pivoted to move through said first, second, and third slots and pivot said first cam member.

9. The shifter of claim 8 in which said first cam member includes a finger extending over the upper edge of said second cam member; said upper edge being shaped to be engaged by said finger whereby pivoting of said first cam member by said handle as it is moved through said first and second slots pivots said second cam member to move said finger which, in turn, moves said cable connector and actuates said cable; said third cam element being mounted on top of said first cam member; and a spring secured between said first and third cam members to control the force required for said third member to move relative to said first cam member.

10. The shifter of claim 9 in which said first and third cam members are arranged at angles relative to said second cam member.

11. The shifter of claim 10 in which said first cam member includes a finger extending over the upper edge of said second cam member; said upper edge being shaped to be engaged by said finger whereby pivoting of said first cam member by said handle as it is moved pivots said second cam member to move said finger which, in turn, moves said cable connector and actuates said cable; said third cam element being mounted on top of said first cam member; and a spring secured between said first and third cam members to control the force required for said third member to move relative to said first cam member.

12. A transmission shifter for a vehicle including a shifter lever assembly movable along a fore and aft serpentine path in shifting from "Park" position to other shifter positions said serpentine path including fore and aft directions and sidewise directions transverse to said fore and aft direction comprising:

a housing having top and side walls said top wall having a slot for guiding said shifter lever assembly along said serpentine path;

a cable actuator for actuating a cable that controls a key mechanism of said vehicle, said actuator being mounted on one of said side walls;

said lever assembly including a handle pivotal relative to said cable actuator;

a first cam member mounted on said lever assembly and operably connected to said cable actuator for actuating said cable actuator in response to the shifting of said handle from "Park" position to other shifter positions;

a third cam member; and an operative connection between said first cam member and third cam member whereby if an undesirable force is exerted on said handle, said third cam member is moved relative to said first cam member to take up such force and prevent movement of said first cam member.

13. A transmission shifter for a vehicle including a shifter lever assembly movable along a fore and aft serpentine path in shifting from "Park" position to other shifter positions comprising:

a housing having top and side walls;

a cable actuator for actuating a cable that controls a key mechanism of said vehicle, said actuator being mounted on one of said side walls;

said lever assembly including a handle pivotal relative to said cable actuator;

a first cam member mounted on said lever assembly and operably connected to said cable actuator for actuating said cable actuator in response to the shifting of said handle from "Park" position to other shifter positions;

a third cam member; and an operative connection between said first cam member and third cam member whereby if an undesirable force is exerted on said handle, said third cam member is moved relative to said first cam member to take up such force and prevent movement of said first cam member; said first cam member and third cam member are pivoted relative to said lever assembly about a first axis; said second cam member is pivoted about a fixed second axis; said lever assembly is pivotal in a fore and aft direction about a third axis parallel to said second axis and said handle is pivotal on said lever assembly in a side-wise direction about a fourth axis; said first cam member and third cam member are normally movable with said lever assembly in a fore and aft direction and pivotal about said first axis by the pivotal movement of said rod in a side-wise direction.

* * * * *

UNITED STATES PATENT AND TRADEMARK OFFICE
CERTIFICATE OF CORRECTION

PATENT NO. : 5,649,452
DATED : July 22, 1997
INVENTOR(S) : Charles (NMI) Osborn et al.

It is certified that error appears in the above-identified patent and that said Letters Patent is hereby corrected as shown below:

Column 1, line 49;
    "locing" should be --locking--.

Signed and Sealed this

Seventeenth Day of November, 1998

Attest:

BRUCE LEHMAN

*Attesting Officer*     *Commissioner of Patents and Trademarks*